US008462744B2

(12) United States Patent
Moritomo

(10) Patent No.: US 8,462,744 B2
(45) Date of Patent: Jun. 11, 2013

(54) WIRELESS PARAMETER SETTING METHOD, BASE STATION, MANAGEMENT APPARATUS, CONTROL METHOD, AND COMPUTER PROGRAM

(75) Inventor: Kazuo Moritomo, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1122 days.

(21) Appl. No.: 12/439,959

(22) PCT Filed: Oct. 5, 2007

(86) PCT No.: PCT/JP2007/070022
§ 371 (c)(1),
(2), (4) Date: Mar. 4, 2009

(87) PCT Pub. No.: WO2008/053688
PCT Pub. Date: May 8, 2008

(65) Prior Publication Data
US 2010/0195589 A1 Aug. 5, 2010

(30) Foreign Application Priority Data

Oct. 30, 2006 (JP) ................................ 2006-294203

(51) Int. Cl.
*H04W 4/00* (2009.01)
(52) U.S. Cl.
USPC ............ 370/338; 370/328; 370/254; 370/343
(58) Field of Classification Search
USPC ........................................................ 370/338
See application file for complete search history.

(56) References Cited

U.S. PATENT DOCUMENTS

| 6,782,260 B2 | 8/2004 | Nakakita et al. |
| 7,580,398 B2 * | 8/2009 | Nakamura .................... 370/338 |

(Continued)

FOREIGN PATENT DOCUMENTS

| JP | 04-054649 A | 2/1992 |
| JP | 2002-159053 A | 5/2002 |

(Continued)

OTHER PUBLICATIONS

Japanese Office Action, of which is enclosed without an English Translation, that issued in Japanese Patent Application No. 2006-294203.
Japanese Office Action, which is enclosed without an English Translation, that issued in Japanese Patent Application No. 2006-294203.
International Search Report issued Nov. 6, 2007, for International Application No. PCT/JP2007/070022.

(Continued)

*Primary Examiner* — Ricky Ngo
*Assistant Examiner* — Dewanda Samuel
(74) *Attorney, Agent, or Firm* — Cowan, Liebowitz & Latman, P.C.

(57) ABSTRACT

A method of making a management apparatus that manages a wireless parameter of a wireless network formed by a base station set the wireless parameter in a wireless communication apparatus, comprising the steps of causing the base station to request the management apparatus to start a wireless parameter setting process when a start of wireless parameter setting is designated in the base station, causing the management apparatus to notify the base station of wireless parameter setting information containing wireless parameter setting start enable/disable information when the management apparatus receives the request from the base station, causing the base station to notify the wireless communication apparatus of the wireless parameter setting information received from the management apparatus, and causing the wireless communication apparatus to execute or stop the wireless parameter setting process for a wireless setting apparatus based on the wireless parameter setting information received from the base station.

10 Claims, 15 Drawing Sheets

U.S. PATENT DOCUMENTS

| | | | |
|---|---|---|---|
| 7,769,837 B2* | 8/2010 | Nogawa et al. | 709/222 |
| 7,920,534 B2* | 4/2011 | Nakayama | 370/338 |
| 2003/0115339 A1* | 6/2003 | Hodoshima | 709/228 |
| 2004/0015575 A1* | 1/2004 | Motoyama | 709/222 |
| 2004/0121764 A1* | 6/2004 | Rivero | 455/418 |
| 2004/0223470 A1* | 11/2004 | Smith | 370/332 |
| 2005/0147073 A1* | 7/2005 | Hietalahti et al. | 370/338 |
| 2005/0170774 A1 | 8/2005 | Shiohara et al. | |
| 2005/0272420 A1* | 12/2005 | Matsuda et al. | 455/426.2 |
| 2006/0003747 A1* | 1/2006 | Kolakowski | 455/414.1 |
| 2006/0039336 A1* | 2/2006 | Ishimura | 370/338ke |
| 2006/0045272 A1* | 3/2006 | Ohaka | 380/270 |
| 2006/0246946 A1* | 11/2006 | Moritomo et al. | 455/557 |

FOREIGN PATENT DOCUMENTS

| | | |
|---|---|---|
| JP | 2002-359623 A | 12/2002 |
| JP | 2005-198154 A | 7/2005 |
| JP | 2006-067174 A | 3/2006 |
| JP | 2006-193146 A | 7/2006 |
| WO | 2005-022162 A1 | 3/2005 |
| WO | 2006/062034 A1 | 6/2006 |

* cited by examiner

WIRELESS PARAMETER SETTING METHOD, BASE STATION, MANAGEMENT APPARATUS, CONTROL METHOD, AND COMPUTER PROGRAM

TECHNICAL FIELD

The present invention relates to a method of making a management apparatus that manages the wireless parameters of a wireless network formed by a base station set the wireless parameters in a wireless communication apparatus.

BACKGROUND ART

It is necessary for commutation using an IEEE802.11 wireless LAN to set, in a device, wireless parameters including a communication channel, network identifier (SSID), encryption scheme, encryption key, authentication scheme, and authentication key. Normally, such wireless parameters are set by using the user interface of a device. However, this work is cumbersome. It is particularly difficult to input the character string of, for example, a network identifier or encryption key to a device except a personal computer (to be referred to as a PC hereinafter), such as a digital camera or printer.

In recent years, easy wireless parameter setting methods have been proposed. They are disclosed in U.S. Pat. No. 6,782,260 (Japanese Patent Laid-Open No. 2002-159053), U.S. Pre-Granted Publication No. 2005/0170774 (Japanese Patent Laid-Open No. 2005-198154), and U.S. Pre-Granted Publication No. 2006/0045272 (Japanese Patent Laid-Open No. 2006-067174).

An example of a method of setting a wireless parameter in a current wireless LAN product will be described below.

First, a PC is connected to an access point (to be referred to as an AP hereinafter) by wire. A wireless parameter input by the user is transferred to the AP, thereby setting the wireless parameter of the AP. Next, a wireless communication apparatus (e.g., printer) that requests connection to the AP is connected to the PC by wire. A wireless parameter of the wireless communication apparatus is set by the same operation as described above. The same wireless parameter is set in the AP and wireless communication apparatus by this method. This allows wireless LAN connection between the AP and the wireless communication apparatus.

In the wireless parameter setting method using a PC, it is necessary to connect the PC to a wireless communication apparatus by wire every time a wireless parameter is to be set in the wireless communication apparatus that requests to join in a wireless network.

In many cases, a PC normally joins in a network. Hence, in setting a wireless parameter in a wireless communication apparatus, the setting is required to be done via the network.

DISCLOSURE OF INVENTION

The present invention provides a technique of solving problems in setting a wireless parameter managed by a management apparatus in a wireless communication apparatus via a base station.

According to one aspect of the present invention, there is provided a method of making a management apparatus that manages a wireless parameter of a wireless network formed by a base station set the wireless parameter in a wireless communication apparatus, comprising the steps of causing the base station to request the management apparatus to start a wireless parameter setting process when a start of wireless parameter setting is designated in the base station, causing the management apparatus to notify the base station of wireless parameter setting information containing wireless parameter setting start enable/disable information when the management apparatus receives the request from the base station, causing the base station to notify the wireless communication apparatus of the wireless parameter setting information received from the management apparatus, and causing the wireless communication apparatus to execute or stop the wireless parameter setting process for a wireless setting apparatus based on the wireless parameter setting information received from the base station.

According to another aspect of the present invention, there is provided a base station in a system for making a management apparatus that manages a wireless parameter of a wireless network formed by the base station set the wireless parameter in a wireless communication apparatus, comprising a designation unit configured to designate a start of wireless parameter setting, a request unit configured to request the management apparatus to start wireless parameter setting when said designation unit designates the start of wireless parameter setting, and a notification unit configured to notify the wireless communication apparatus of wireless parameter setting information containing wireless parameter setting start enable/disable information as a response to the request from said request unit.

According to still another aspect of the present invention, there is provided a management apparatus in a system for making the management apparatus that manages a wireless parameter of a wireless network formed by a base station set the wireless parameter in a wireless communication apparatus, comprising a reception unit configured to receive a wireless parameter setting start request which is transmitted from the base station when a wireless parameter setting start designation is input in the base station, a determination unit configured to determine whether a wireless parameter setting process is being executed in accordance with reception by said reception unit, and a transmission unit configured to transmit wireless parameter setting information containing wireless parameter setting start enable/disable information to the base station in accordance with a determination result by said determination unit.

According to yet another aspect of the present invention, there is provided a control method of a base station in a system for making a management apparatus that manages a wireless parameter of a wireless network formed by the base station set the wireless parameter in a wireless communication apparatus, comprising the steps of requesting the management apparatus to start wireless parameter setting when the base station is designated to start wireless parameter setting, and notifying the wireless communication apparatus of wireless parameter setting information containing wireless parameter setting start enable/disable information transmitted from the management apparatus as a response to the request.

According to still yet another aspect of the present invention, there is provided a control method of a management apparatus in a system for making the management apparatus that manages a wireless parameter of a wireless network formed by a base station set the wireless parameter in a wireless communication apparatus, comprising the steps of receiving a wireless parameter setting start request which is transmitted from the base station when a wireless parameter setting start designation is input in the base station, determining whether a wireless parameter setting process is being executed in accordance with the reception, and transmitting wireless parameter setting information containing wireless parameter setting start enable/disable information to the base station in accordance with a determination result.

According to still yet another aspect of the present invention, there is provided a computer-readable storage medium storing computer-executable process steps, the computer-executable process steps causing a computer to execute the above method.

Further features of the present invention will become apparent from the following description of exemplary embodiments with reference to the attached drawings.

BEST MODE FOR CARRYING OUT THE INVENTION

The exemplary embodiments of the present invention will be described below in detail with reference to the accompanying drawings. Note that the following embodiments are not intended to limit the scope of the invention, and all combinations of features described in the embodiment are not always indispensable for the solving means of the invention.

In each embodiment, an example will be explained in which a wireless parameter managed by a wireless setting management apparatus (to be referred to as a management apparatus hereinafter) is easily set in a digital still camera (to be referred to as a DSC hereinafter) or printer via a wireless base station (access point: to be referred to as an AP hereinafter).

Figure 1:
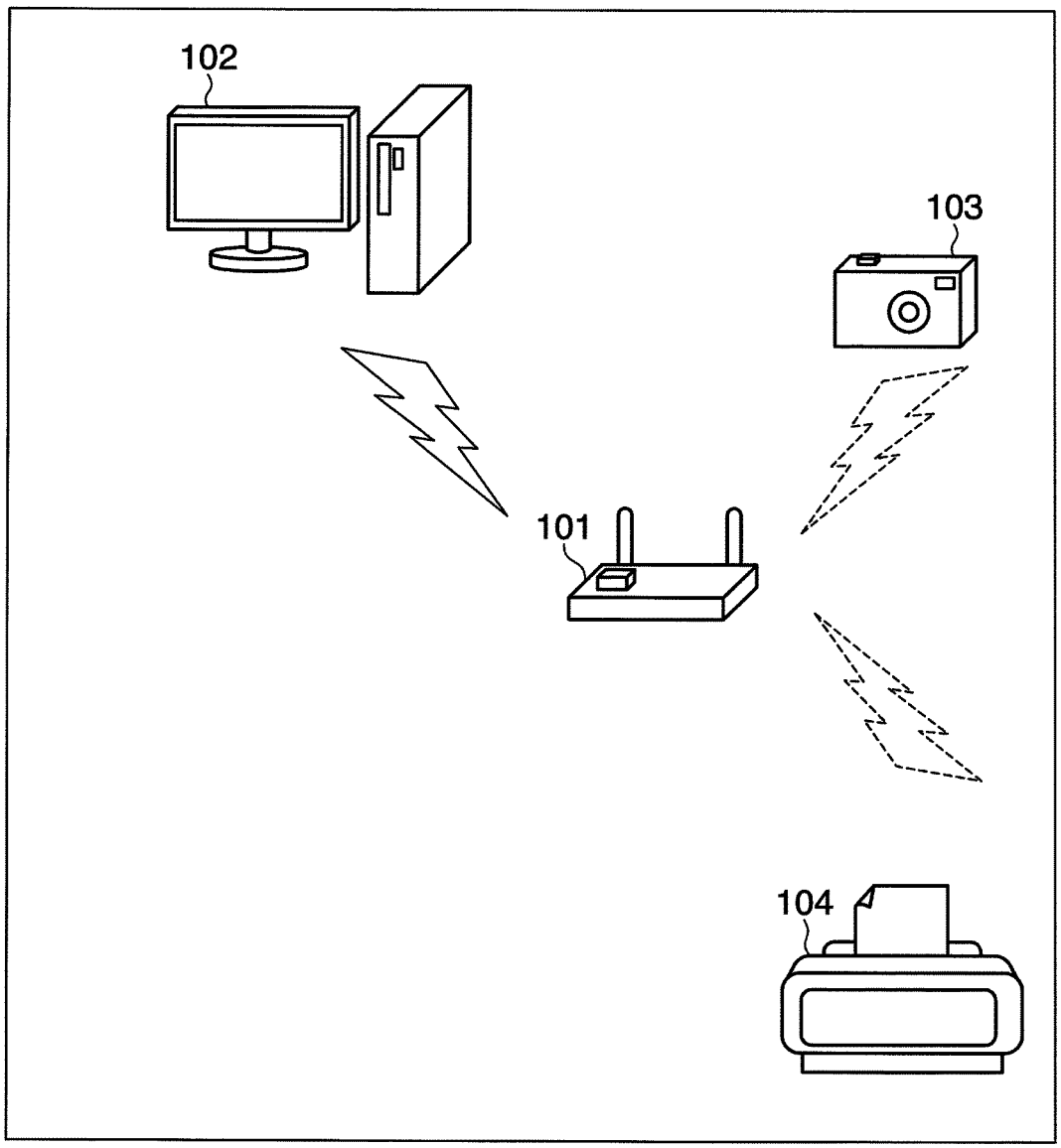
FIG. 1 is a view showing a system configuration according to the first, third, and fourth embodiments.
Figure 2:
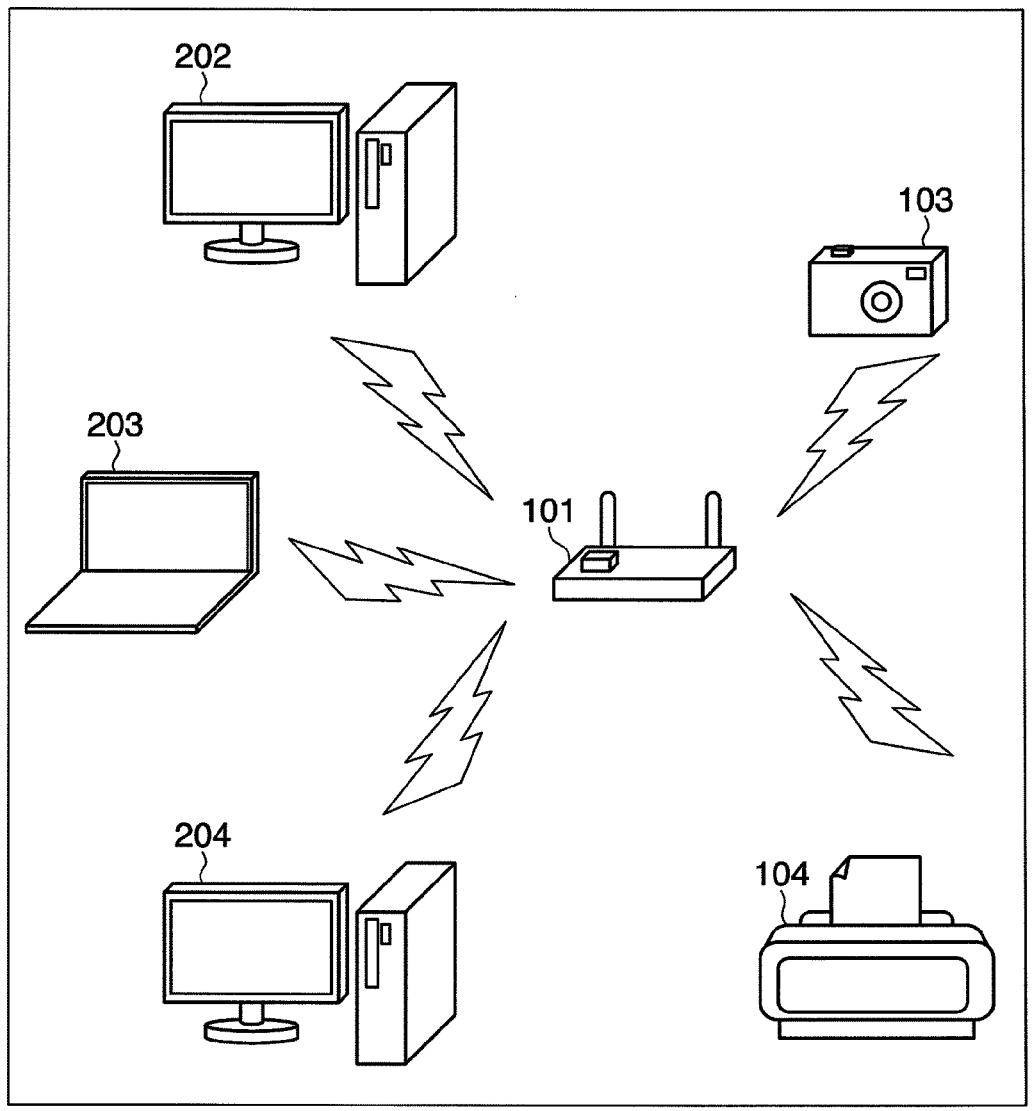
FIG. 2 is a view showing a system configuration according to the second embodiment.

FIGS. 1 and 2 are views showing the configurations of a wireless parameter setting system according to the embodiments.

Each of a management apparatus, DSC, printer, and AP has a wireless communication function based on the IEEE802.11 wireless LAN standard. The management apparatus, DSC, and printer can communicate through the AP in an infrastructure mode. The infrastructure mode is a communication mode in which wireless communication apparatuses communicate with each other via an AP under the control of the AP.

An AP 101 has functions of interfacing a wireless network with a wired network, controlling a radio signal, encrypting radio data to be transmitted/received, and authenticating a wireless communication apparatus as a connection request target.

Each of management apparatuses 102 and 202 to 204 manages wireless parameters in a wireless network formed by the AP 101 and provides wireless parameters to a wireless communication apparatus. In this example, PCs in which dedicated software is installed serve as the management apparatuses 102 and 202 to 204. The software also has a function of starting a wireless parameter setting process. The wireless parameter setting process starts when the user presses a wireless setting start button (not shown) provided on the management apparatus 102. The wireless parameters managed by the management apparatus include a communication channel, network identifier (SSID), encryption scheme, encryption key, authentication scheme, and authentication key. The IEEE802.11 wireless LAN has standards such as 802.11a, 802.11b, and 802.11g. It is also possible to manage, as a wireless parameter, information representing the standard to be used.

A DSC 103 has a wireless communication function of IEEE802.11 wireless LAN and can wirelessly communicate with the printer or management apparatus.

A printer 104 has a wireless communication function of IEEE802.11 wireless LAN, like the DSC 103.

Each of the DSC 103 and printer 104 has a wireless setting start button which designates the start of wireless parameter setting, as will be described later. It is possible to automatically start the wireless parameter setting process through the AP 101 by pressing the wireless setting start button of the management apparatus and that of the DSC 103 or printer 104.

However, to set wireless parameters, the user has to operate both a management apparatus and a wireless communication apparatus such as a DSC or printer. If, for example, the management apparatus is installed far away, the setting is not easy.

If a plurality of management apparatuses exist, as shown in FIG. 2, the user may be confused about which management apparatus to operate.

The embodiments to be described below aim at solving various problems that arise when wireless parameters managed by a management apparatus are to be set in a wireless communication apparatus via an AP.

First Embodiment

In the first embodiment, a process example will be described, in which wireless parameters managed by a management apparatus are to be set in a DSC.

FIG. 1 is a view showing the configuration of a wireless parameter setting system according to this embodiment.

Figure 3:
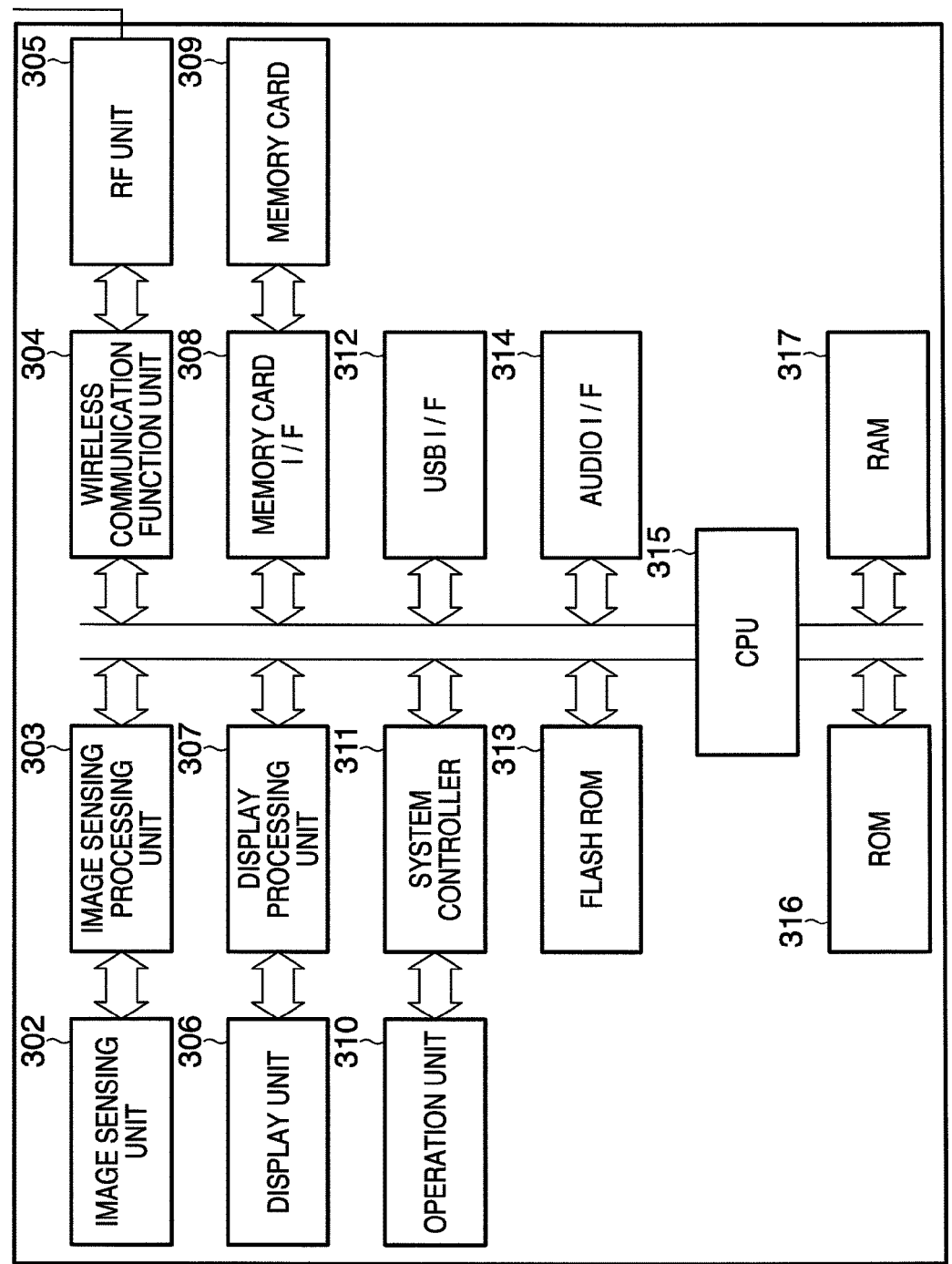
FIG. 3 is a functional block diagram of a DSC having a wireless communication function.

FIG. 3 is a functional block diagram of a DSC 103 according to this embodiment.

An operation unit 310 is connected to a CPU 315 via a system controller 311. The operation unit 310 includes the shutter switch and various kinds of keys of the DSC. The operation unit 310 also includes a wireless setting start button to designate the start of wireless parameter setting.

An image sensing unit 302 is a block which senses an image when the user presses the shutter button. An image sensing processing unit 303 processes this block.

A display unit 306 is a block which displays information for the user by using an LCD, LED, and sound. A display processing unit 307 controls the display contents. An operation of, for example, selecting one of pieces of information displayed on the display unit 306 is done in cooperation with the operation unit 310. That is, the display unit 306 and operation unit 310 serve as a user interface.

An RF unit 305 and wireless communication function unit 304 form a wireless communication interface. The RF unit 305 includes a hardware block which converts an analog signal received from an antenna into a digital signal or inversely converts a digital signal into an analog signal and transmits it from the antenna.

The wireless communication function unit 304 includes a MAC layer which controls communication and hardware which processes firmware to drive the MAC layer. The wireless communication function unit 304 incorporates a flash ROM which can store a MAC address and the like.

A memory card interface (to be referred to as an I/F hereinafter) 308 is an interface to connect a detachable memory card 309. A USB I/F 312 is an interface to connect an external device by using a USB. An audio I/F 314 is an interface to connect a sound signal to an external device.

The functional units shown in the block diagram are processed under the control of the CPU 315. A ROM 316 or flash ROM 313 stores an operation program shown in FIG. 10 (to be described later). The CPU 315 executes a process in accordance with the program.

Data to be processed by the CPU 315 is written in or read out from a RAM 317 or flash ROM 313. The flash ROM 313 is a nonvolatile storage area which stores, for example, wireless communication setting information. Sensed image data is stored in the memory card 309 via the memory card I/F 308.

Figure 4:
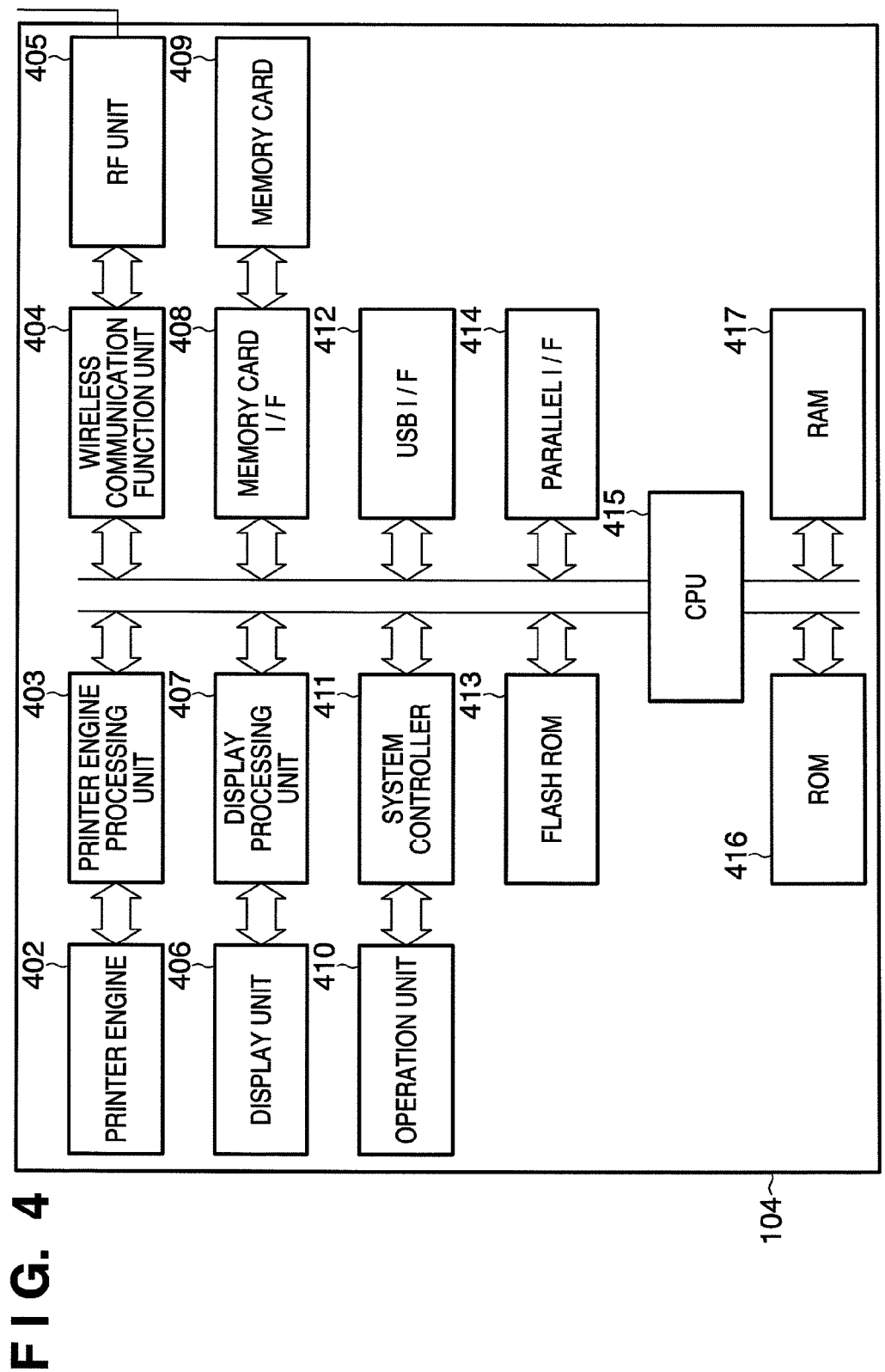
FIG. 4 is a functional block diagram of a printer having a wireless communication function.

FIG. 4 is a functional block diagram of a printer 104 according to this embodiment.

An operation unit 410 is connected to a CPU 415 via a system controller 411. The operation unit 410 also includes a wireless setting start button to start setting wireless parameters.

A printer engine 402 is a functional block which actually prints an image on paper. A printer engine processing unit 403 processes this block.

A display unit 406 is a block which displays information for the user by using an LCD, LED, and sound. A display processing unit 407 controls the display contents. An operation of, for example, selecting one of pieces of information displayed on the display unit 406 is done via the operation unit 410. That is, the display unit 406 and operation unit 410 serve as the user I/F of the printer 104 according to this embodiment.

An RF unit 405 and wireless communication function unit 404 form a wireless communication interface. The RF unit 405 includes a hardware block which converts an analog signal received from an antenna into a digital signal or inversely converts a digital signal into an analog signal and transmits it from the antenna. The wireless communication function unit 404 includes a MAC layer which controls communication and hardware which processes firmware to drive the MAC layer. The wireless communication function unit 404 incorporates a flash ROM which can store a MAC address and the like.

A memory card I/F 408 is an interface to connect a detachable memory card 409. A memory card used in, for example, a DSC may be inserted into the memory card I/F 408 to print a sensed image. A USB I/F 412 is an interface to connect an external device by using a USB. A parallel I/F 414 is an interface to connect an external device (mainly a host computer) by using parallel communication.

The functional units shown in the block diagram are processed under the control of the CPU 415. A ROM 416 or flash ROM 413 stores an operation program shown in FIG. 10 (to be described later). The CPU 415 executes a process in accordance with the program. Data to be processed by the CPU 415 is written in or read out from a RAM 417 or flash ROM 413.

The flash ROM 413 is a nonvolatile storage area which stores, for example, wireless communication setting information.

Figure 5:
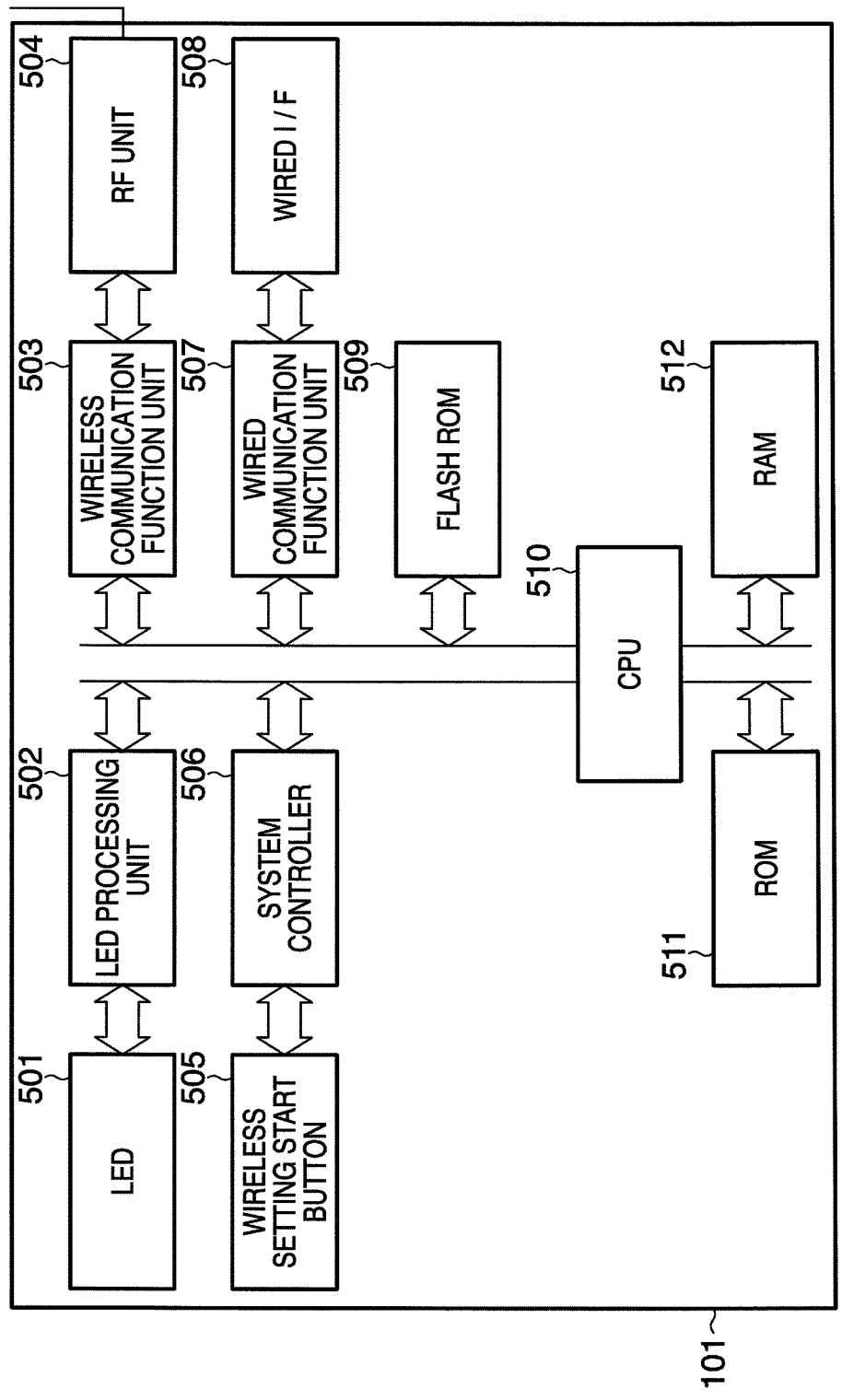
FIG. 5 is a functional block diagram of an AP having a wireless communication function.

FIG. 5 is a functional block diagram of an AP 101 according to this embodiment.

A wireless setting start button 505 is connected to a CPU 510 via a system controller 506. The user can start a wireless parameter setting process by operating this button.

An LED 501 indicates information about the operation state of the AP for the user. An LED processing unit 502 controls the display contents. The LED 501 also displays the execution result and process state of the wireless parameter setting process.

An RF unit 504 and wireless communication function unit 503 form a wireless communication interface. The RF unit 504 includes a hardware block which converts an analog signal received from an antenna into a digital signal or inversely converts a digital signal into an analog signal and transmits it from the antenna. The wireless communication function unit 503 includes a MAC layer which controls communication and hardware which processes firmware to drive the MAC layer. The wireless communication function unit 503 incorporates a flash ROM which can store a MAC address and the like.

A wired communication function unit 507 is a block which controls wired communication. A wired I/F 508 transmits/receives a signal to a wired communication system such as an Ethernet.

The functional units shown in the block diagram are processed under the control of the CPU 510. A ROM 511 or flash ROM 509 stores an operation program shown in FIG. 11 (to be described later). The CPU 510 executes a process in accordance with the program. Data to be processed by the CPU 510 is written into or read out from a RAM 512 or flash ROM 509. The flash ROM 509 is a nonvolatile storage area which stores, for example, wireless communication setting information. The flash ROM also stores (registers) communicable management apparatuses (a management apparatus 102 in the system show in FIG. 1 and management apparatuses 202 to 204 in the system shown in FIG. 2).

The block diagrams of the devices included in the network system shown in FIG. 1 have been described above. The operation flow of each device will be described next.

Figure 10:
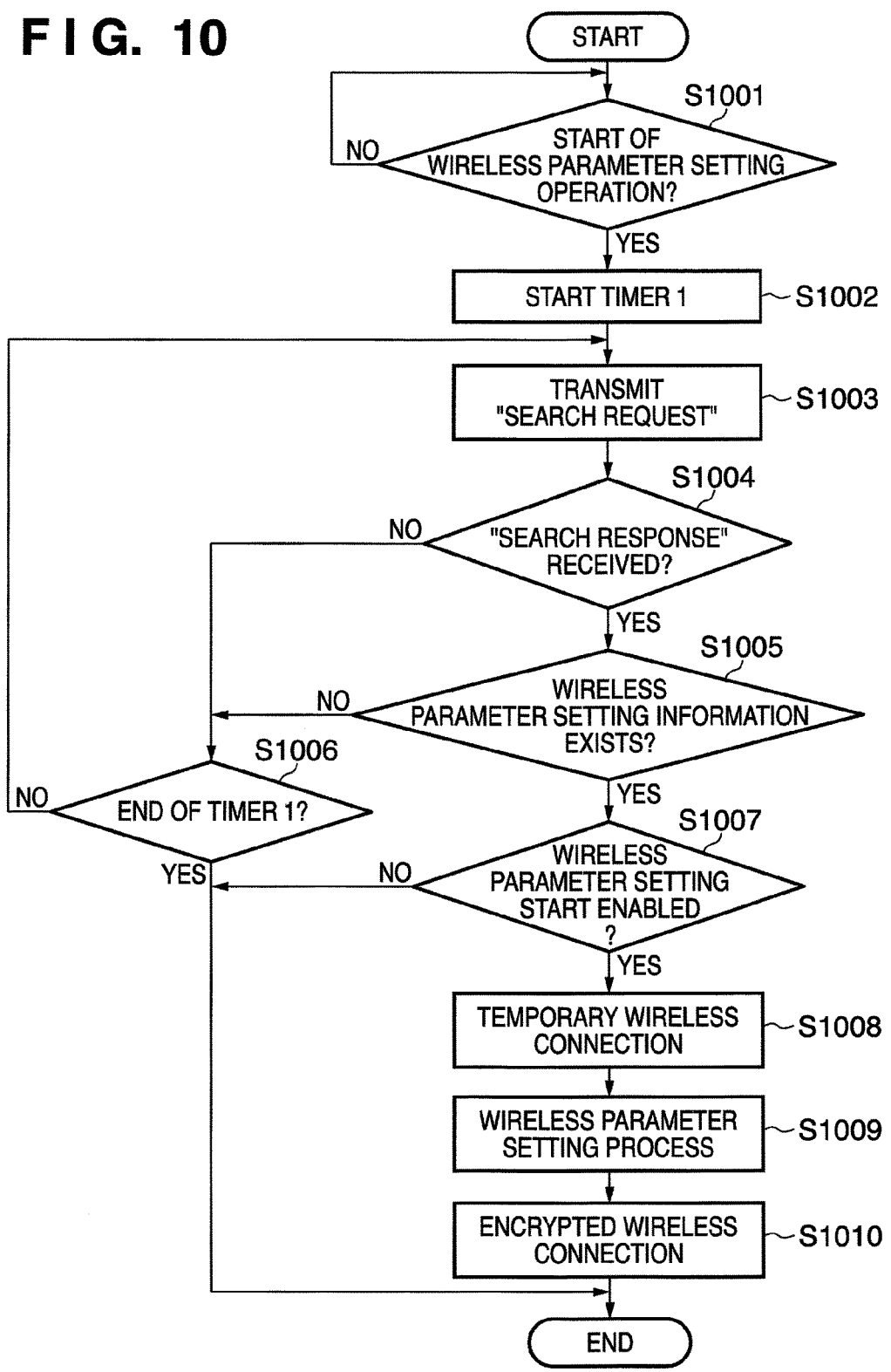
FIG. 10 is a flowchart of a wireless communication apparatus according to the embodiment of the present invention.

FIG. 10 is a flowchart illustrating the operation flow of the DSC 103 and printer 104. The DSC 103 will be exemplified here.

When the user presses the wireless setting start button provided on the operation unit 310 of the DSC 103 (YES in S1001), the DSC 103 starts timer 1 to measure the reception wait time of a "search response" which is transmitted as a response to a "search request" (S1002). The DSC 103 transmits a "search request" to search for an AP having a function of setting wireless parameters managed by the management apparatus (S1003).

If no "search response" is received during the operation of timer 1 (S1004), or a "search response" containing no wireless parameter setting capability or procedure information is received (S1005), the DSC 103 resends the "search request" (S1006 and S1003).

If a "search response" is received during the operation of timer 1 (YES in S1004), the DSC 103 confirms whether the "search response" contains wireless parameter setting information including wireless parameter setting start enable/disable information (S1005). If wireless parameter setting information is contained (YES in S1005), the DSC 103 checks based on the information whether wireless parameter setting can start (S1007).

If wireless parameter setting cannot start (NO in S1007), the DSC 103 finishes the process. If wireless parameter setting can start (YES in S1007), the DSC 103 is temporarily wirelessly connected to the AP 101 (S1008).

In step S1008, the DSC 103 is temporarily wirelessly connected to the AP 101 by using an SSID (network identifier) contained in the "search response" received in step S1004. It is also possible to cause a device in the system to determine the SSID for temporary wireless connection in advance and temporarily wirelessly connect the DSC 103 to the AP 101 by using the SSID.

The DSC 103 executes a process of setting wireless parameters distributed from the management apparatus via the AP 101 (S1009). The wireless parameters distributed from the management apparatus may be wireless parameters for connection to the AP 101 or those for connection to another AP (not shown). In this example, wireless parameters for connection to the AP 101 are distributed and set in the DSC 103.

After the wireless parameter setting, the DSC 103 executes an encryption unit validated in the AP 101, based on the set wireless parameters, thereby executing wireless connection (encrypted wireless connection) to the AP 101 (S1010).

If no "search response" containing wireless parameter setting capability or procedure information is received during the operation of timer 1 (YES in S1006), the DSC 103 finishes the wireless parameter setting process.

The operation flow of the AP 101 will be described next with reference to FIGS. 11A to 11D.

When the user presses the wireless setting start button 505 (YES in S1101 and S1102), the AP 101 executes process 1 (S1103). Upon receiving a "wireless parameter setting start" or "wireless parameter setting stop" from the management apparatus (YES in S1101 or S1104), the AP 101 executes process 2 (S1105). Upon receiving a "search request" from the DSC 103 or printer 104 (YES in S1101 and S1106), the AP 101 executes process 3 (S1107). The AP 101 can execute processes 1 to 3 in parallel. For example, upon receiving a "search request" during execution of process 1, the AP 101 executes processes 1 and 3 in parallel.

Process 1 will be described with reference to FIG. 11B.

The AP 101 selects a management apparatus to request it to start setting wireless parameters (S1111). The AP 101 starts timer 3 to measure the reception wait time of a "wireless parameter setting process start/stop" as a response to the "wireless parameter setting request" (S1112). The AP 101 transmits, to the selected management apparatus, a "wireless parameter setting request" to request the start of wireless parameter setting (S1113).

Upon receiving a "wireless parameter setting start" or "wireless parameter setting stop" from the management apparatus during the operation of timer 3 (YES in S1114 or NO in S1116), the AP 101 executes process 2 (S1115).

If neither the "wireless parameter setting start" nor "wireless parameter setting stop" is received during the operation of timer 3 (NO in S1114 and YES in S1116), the AP 101 determines whether to transmit the "wireless parameter setting request" to another registered management apparatus (S1117). To transmit the "wireless parameter setting request" to another management apparatus (YES in S1117), the process returns to step S1111. If the "wireless parameter setting request" is not to be transmitted to another management apparatus (NO in S1117), the AP 101 finishes process 1.

Process 2 will be described next with reference to FIG. 11C. As described above, the AP 101 executes process 2 upon receiving a "wireless parameter setting start" or "wireless parameter setting stop" from the management apparatus.

The AP 101 acquires wireless parameter setting enable/disable information and wireless parameter setting capability or procedure information from the "wireless parameter setting start" or "wireless parameter setting stop" received from the management apparatus (S1121).

If wireless parameter setting is possible (YES in S1122), the AP 101 adds the wireless parameter setting capability or procedure information acquired from the "wireless parameter setting start" to the "search response" and prepares for transmission (S1123). The AP 101 transmits, to the management apparatus, a "wireless parameter acquisition request" to designate the start of wireless parameter distribution (S1124).

If wireless parameter setting is impossible (NO in S1122), the AP 101 adds, to the "search response", information representing that wireless parameter setting is impossible and prepares for transmission (S1125).

Process 3 will be described next with reference to FIG. 11D. As described above, the AP 101 executes process 3 upon receiving a "search request" from the DSC 103 or printer 104. A case wherein the "search request" is received from the DSC 103 will be described here.

The AP 101 confirms whether the "wireless parameter setting start" or "wireless parameter setting stop" is already received from the management apparatus (S1131).

Figure 11A:
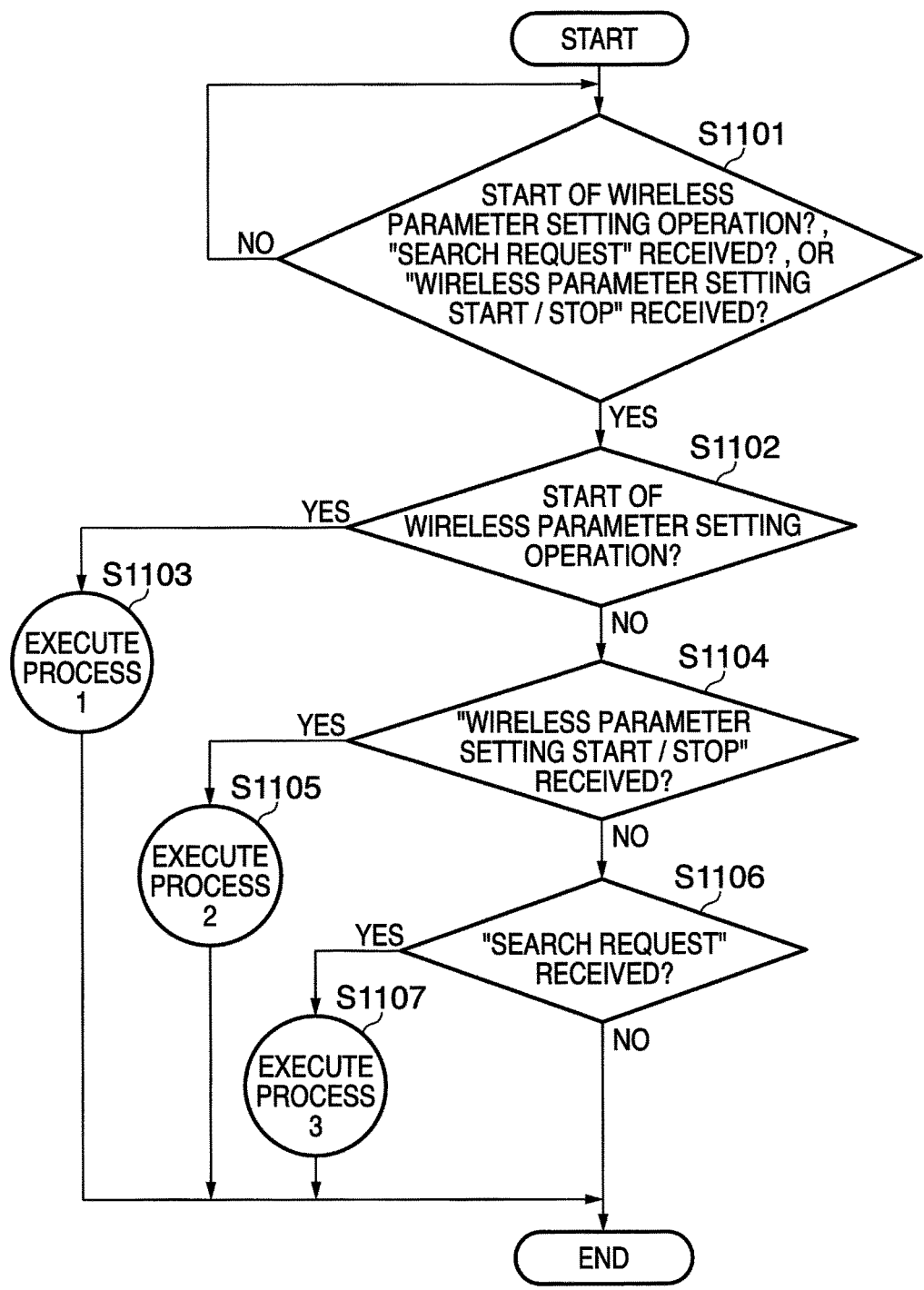
FIGS. 11A to 11D are flowcharts of an AP according to the embodiment of the present invention.
Figure 11B:
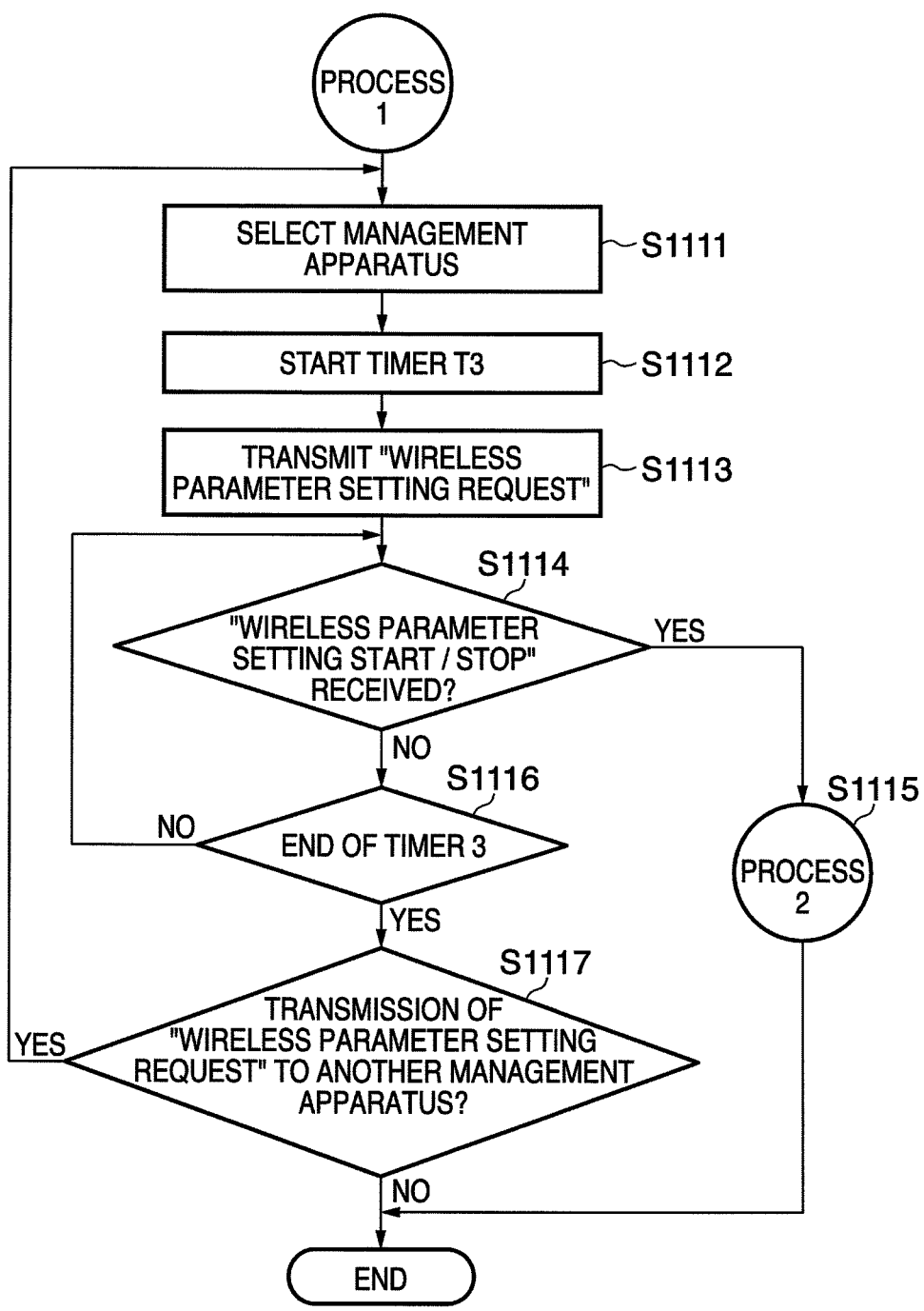
Figure 11C:
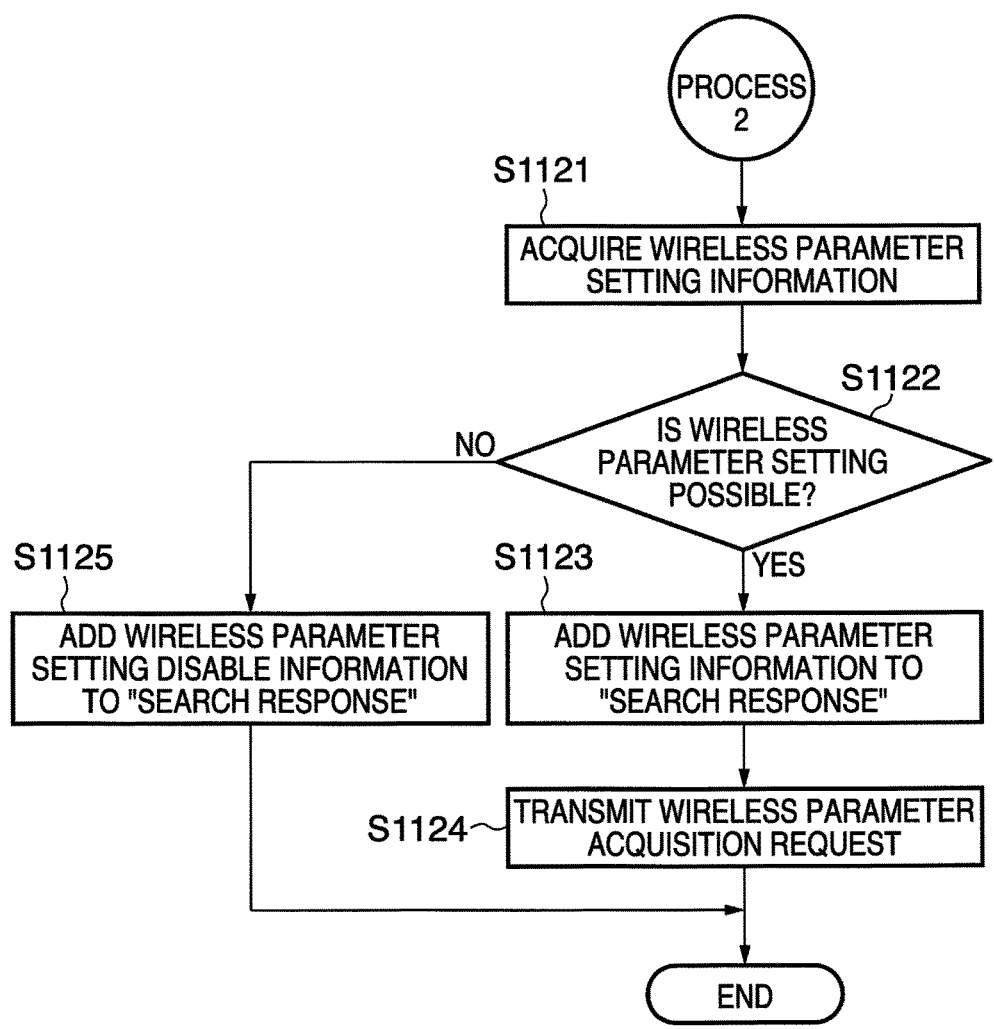

If the "wireless parameter setting start" or "wireless parameter setting stop" has already been received (YES in S1131), the AP 101 transmits, to the DSC 103, the "search response" prepared for transmission in step S1123 or S1125 in FIG. 11C (S1132). If wireless parameter setting is possible (YES in S1133), the AP is temporarily wirelessly connected to the DSC 103 (S1134). If wireless parameter setting is impossible (NO in S1133), the AP 101 finishes process 3.

If neither the "wireless parameter setting start" nor "wireless parameter setting stop" is received (NO in S1131), the AP 101 transmits a "search response" without wireless parameter setting enable/disable information to the DSC 103 (S1135) and finishes process 3.

Figure 12:
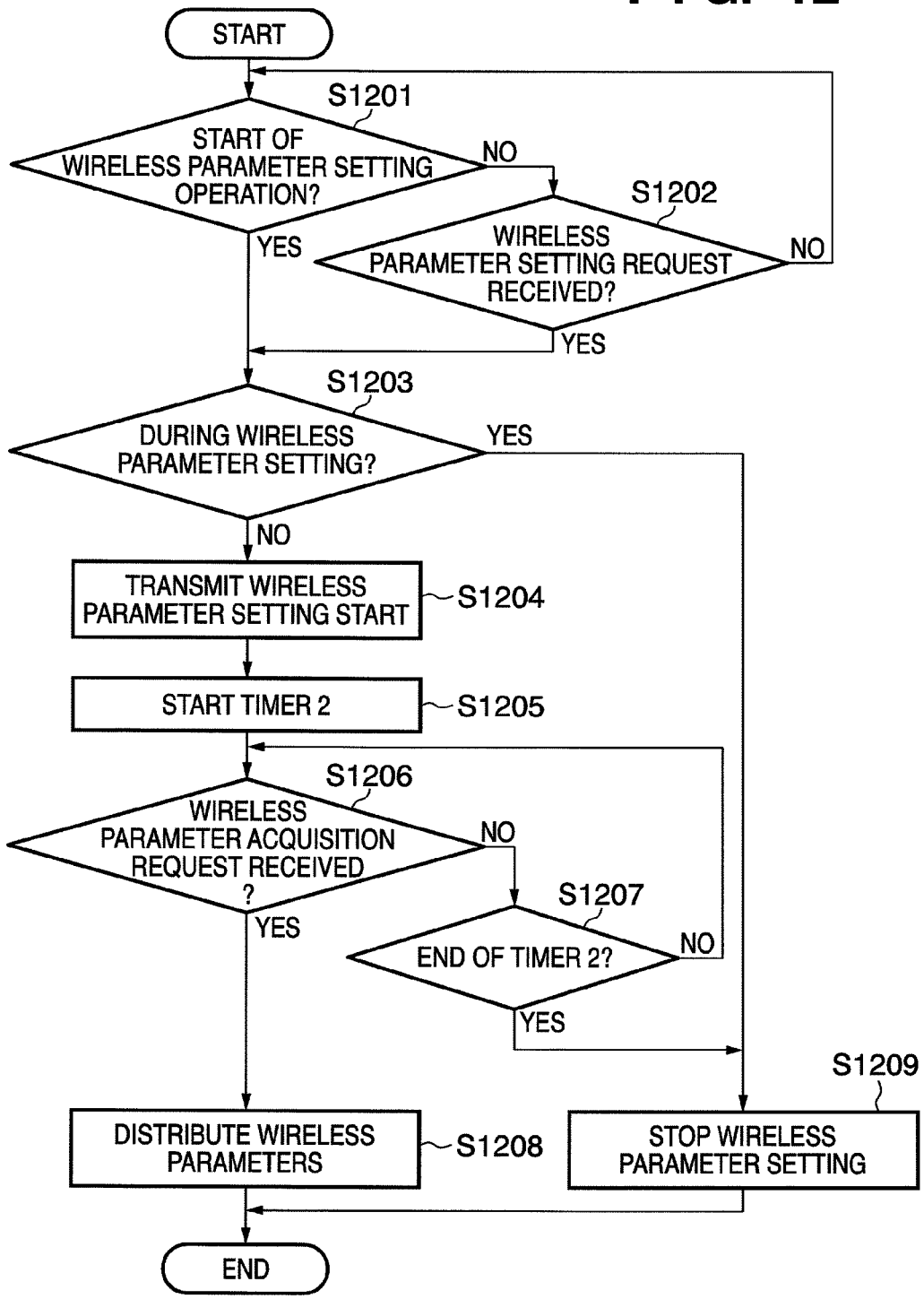
FIG. 12 is a flowchart of a management apparatus according to the embodiment of the present invention.

The operation flow of the management apparatus will be described next with reference to FIG. 12.

When the user presses the wireless setting start button (YES in S1201), or a "wireless parameter setting request" is received from the AP 101 (YES in S1202), the management apparatus confirms whether wireless parameter setting is already progressing (S1203).

If wireless parameter setting is not progressing (NO in S1203), the management apparatus transmits, to the AP 101, a "wireless parameter setting start" containing wireless parameter setting enable information and wireless parameter setting capability or procedure information.

The management apparatus starts timer 2 to measure the wait time until a "wireless parameter acquisition request" is received from the AP 101 (S1205). The "wireless parameter acquisition request" is a signal to designate the start of wireless parameter distribution.

Upon receiving the "wireless parameter acquisition request" from the AP 101 during the operation of timer 2 (YES in S1206), the management apparatus distributes wireless parameters to the DSC 103 or printer 104 via the AP 101 (S1208).

If wireless parameter setting is progressing (YES in S1203), the management apparatus neglects the newly requested setting process and continues the setting process that is progressing (S1209). For example, upon receiving a "wireless parameter setting request" from the AP 101 during wireless parameter setting, the management apparatus transmits a "wireless parameter setting stop" to the AP 101.

If no "wireless parameter acquisition request" is received from the AP 101 (NO in S1206), the management apparatus determines whether timer 2 is operating (S1207). If timer 2 is operating, the flow returns to step S1206. If timer 2 finishes, the management apparatus stops the wireless parameter setting process (S1209).

Figure 6:
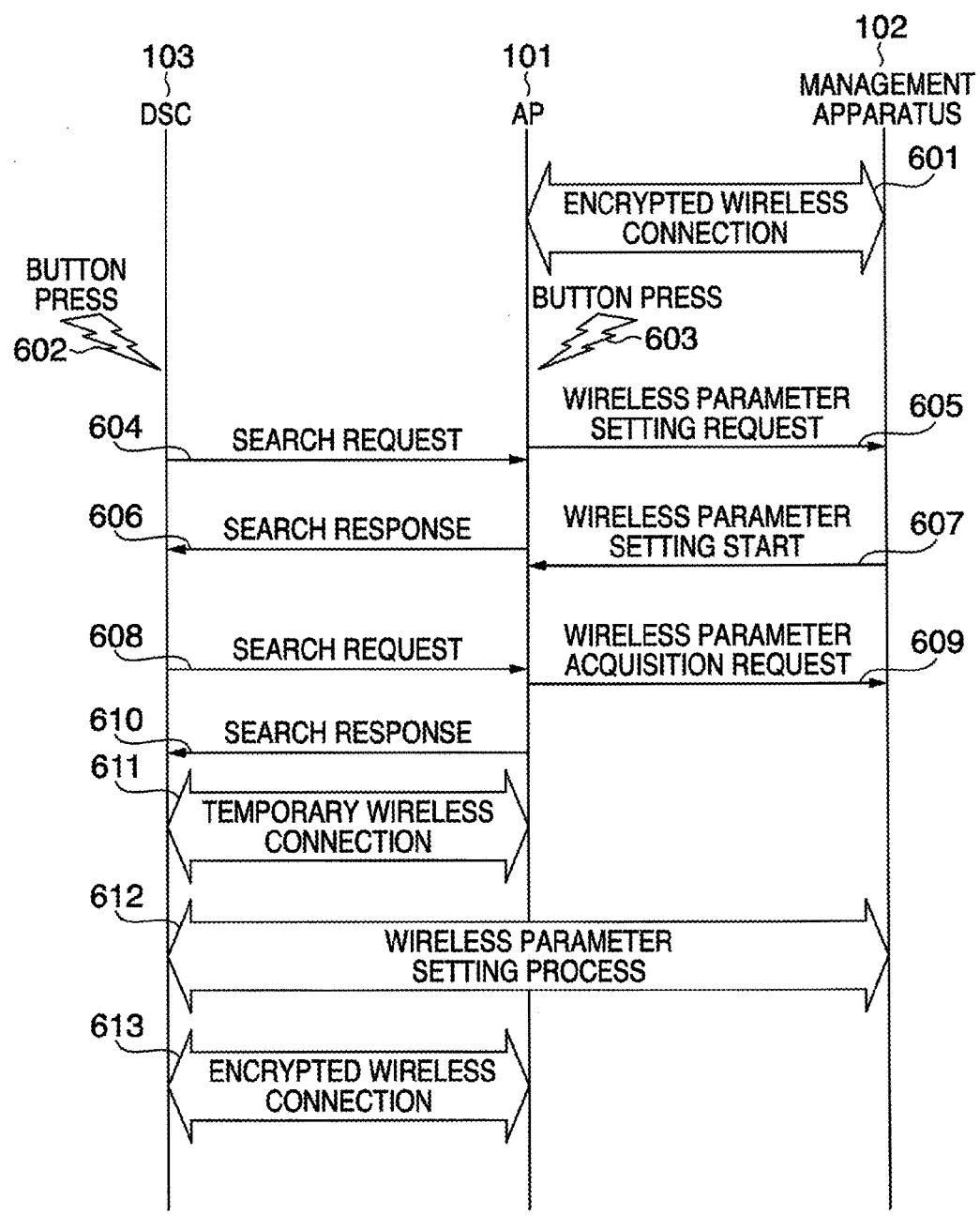
FIG. 6 is a sequence chart according to the first embodiment.

The operation flows of the DSC 103, printer 104, AP 101, and management apparatus according to this embodiment have been described above. A method of setting, in the DSC 103, wireless parameters managed by the management apparatus will be described with reference to FIG. 6 that shows a sequence of this embodiment and FIGS. 10 to 12 that illustrate the operation flows of the devices.

The AP 101 and management apparatus 102 are connected by wireless connection for which arbitrary encryption is valid (601). When the user operates the wireless setting start button provided on the operation unit 310 of the DSC 103 and the wireless setting start button 505 provided on the AP 101 (602 and 603), the wireless parameter setting process starts (YES in S1001, S1101, and S1102).

The DSC 103 transmits a "search request" to search for an AP having a function of setting wireless parameters managed by a management apparatus (604, S1003).

The AP 101 selects a management apparatus to request it to start setting wireless parameters (S1111 in FIG. 11B). Since only the management apparatus 102 is registered in the AP 101, the AP 101 selects the management apparatus 102. The AP 101 transmits, to the management apparatus 102, a "wireless parameter setting request" to request the start of the wireless parameter setting process (605, S1113).

Upon receiving the "wireless parameter setting request" (YES in S1202), the management apparatus 102 confirms whether it is currently setting wireless parameters (S1203). Since wireless parameter setting is not progressing (NO in S1203), the management apparatus 102 transmits a "wireless parameter setting start" to the AP 101 (607, S1204).

Figure 11D:
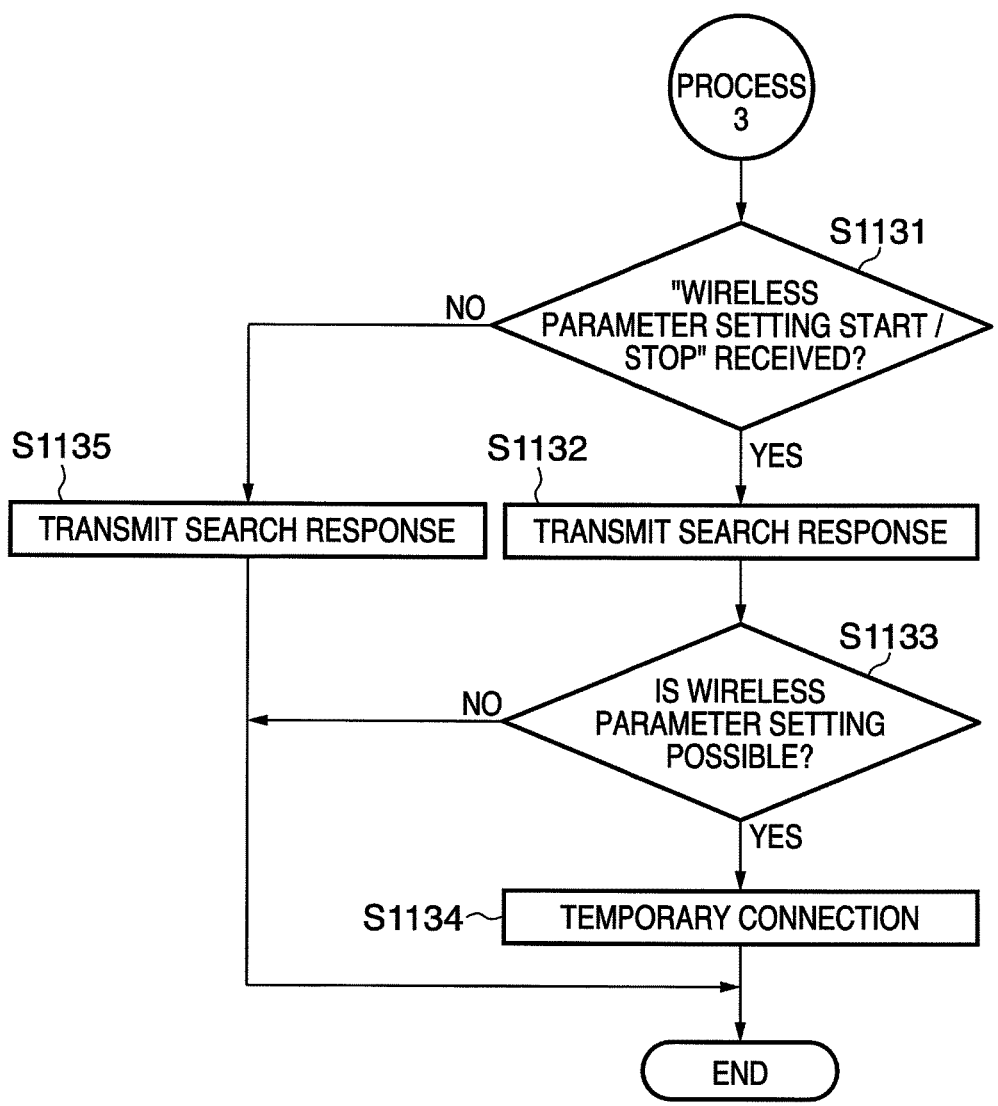

Upon receiving a "search request" (604) from the DSC 103 (S1106 in FIG. 11A), the process advances to process 3 (S1107) to confirm whether a "wireless parameter setting start" or "wireless parameter setting stop" has already been received (S1131 in FIG. 11D). Since neither the "wireless parameter setting start" nor "wireless parameter setting stop" is received at this point of time (NO in S1131), the AP 101 transmits a "search response" without wireless parameter setting enable/disable information to the DSC 103 (606, S1135).

Upon receiving a "wireless parameter setting start" (607) (YES in S1114 in FIG. 11B), the AP 101 executes process 2 (S1115). The AP 101 acquires wireless parameter setting enable/disable information and wireless parameter setting capability or procedure information from the received "wireless parameter setting start" (607) (S1121). Since the wireless parameter setting process is possible (YES in S1122), the AP 101 adds the information acquired from the "wireless parameter setting start" (607) to the "search response" and prepares for transmission (S1123). The AP 101 transmits, to the management apparatus, a "wireless parameter acquisition request" to designate the start of wireless parameter distribution (609, S1124). Upon receiving the "search response" (606) (YES in S1104), the DSC 103 confirms whether wireless parameter setting information is contained (S1005). As described above, since the "search response" (606) contains no wireless parameter setting information (NO in S1005), the DSC 103 resends the "search request" to the AP 101 (608, NO in S1006, S1003).

Upon receiving the "search request" (608) from the DSC 103 again (YES in S1106 in FIG. 11A), the AP 101 advances to "process 3" (S1107). In this example, since the "wireless parameter setting start" (607) has already been received (YES in S1131), the AP 101 transmits, to the DSC 103, the "search response" prepared for transmission in step S1123 (610, S1132). As described above, the "search response" (610) contains information acquired from the "wireless parameter setting start" (607).

Upon receiving the "search response" (610) (YES in S1004 and YES in S1005), the DSC 103 determines whether the wireless parameter setting process can start (S1007). Since the wireless parameter setting process can start (YES in S1007), the DSC 103 sends a temporary wireless connection request to the AP 101 (S1008).

Since wireless parameter setting is possible (YES in S1133), the AP 101 that has transmitted the "search response" (610) receives the temporary connection request from the DSC 103 (S1134). As a result, the DSC 103 and AP 101 are temporarily wirelessly connected (611).

After connection, the DSC 103 and the management apparatus 102 that has received the "wireless parameter acquisition request" (YES in S1206) execute the wireless parameter setting process via the AP 101 (612, S1009, S1208). After the wireless parameter setting, the DSC 103 executes an encryption unit validated in the AP 101 based on the set wireless parameters, thereby executing wireless connection to the AP 101 (613, S1010).

According to this embodiment, when the user presses the wireless setting start buttons which are provided on the AP and the wireless communication apparatus (DSC) that requests join in the wireless network, the wireless parameter setting process can be done between the wireless communication apparatus and the management apparatus. For example, even when the management apparatus is installed far away from the wireless communication apparatus, wireless parameters can easily be set simply by operating the wireless setting start button provided on the AP.

Second Embodiment

In the first embodiment, a case wherein only one management apparatus exists has been described. In the second embodiment, a case wherein there are a plurality of management apparatuses, as shown in FIG. 2, will be described. The functional block diagrams and operation flows of a DSC, AP, and management apparatus according to this embodiment are the same as in the first embodiment.

A wireless environment changes every moment. For this reason, some management apparatuses may be unable to establish wireless communication with an AP 101 because of a worse wireless environment. Additionally, since not all management apparatuses are always in the visible range of the operator of the AP 101, he/she may overlook the power-OFF state of an management apparatus. Alternatively, a management apparatus may be unable to execute the wireless parameter setting process due to some reason and notify the AP 101 of the stop of wireless parameter setting. In this embodiment, assume that management apparatuses 202 and 203 cannot establish wireless communication with the AP 101 due to some reason, and only a management apparatus 204 can establish wireless communication.

Figure 7:
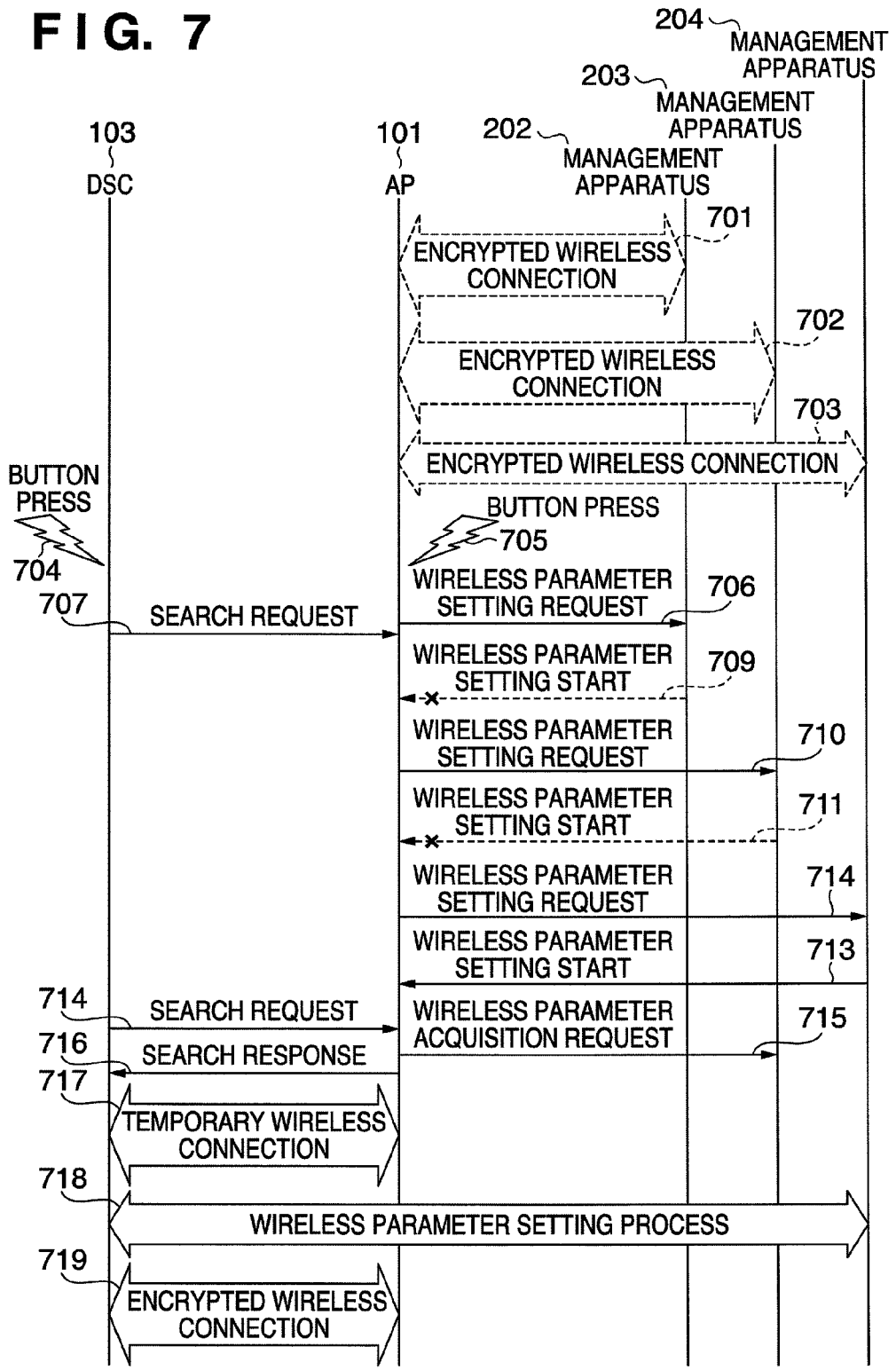
FIG. 7 is a sequence chart according to the second embodiment.

This will be described below with reference to FIG. 7 that shows a sequence of this embodiment and FIGS. 10 to 12 that illustrate the operation flows of the devices.

Referring to FIG. 2, the AP 101 and management apparatuses 202, 203, and 204 are connected by wireless connection for which arbitrary encryption is valid (701 to 703). It is possible to register the priorities of the management apparatuses in a flash ROM 509 of the AP 101. In this embodiment, the priorities are set as High: management apparatus 202
Medium: management apparatus 203
Low: management apparatus 204.

Note that the user may set the priorities of the management apparatuses in the AP in advance.

When the user operates a wireless setting start button provided on an operation unit 310 of a DSC 103 and a wireless setting start button 505 provided on the AP 101 (704 and 705), the wireless parameter setting process starts (S1001, S1101, and S1102).

The DSC 103 transmits a "search request" to search for an AP having a function of setting wireless parameters managed by a management apparatus (707, S1003).

The AP 101 selects a management apparatus to request it to start setting wireless parameters (S1111 in FIG. 11B). Since the management apparatus 202 has the highest priority, the AP 101 selects it. The AP 101 transmits, to the management apparatus 202, a "wireless parameter setting request" to request the start of the wireless parameter setting process (706, S1113).

However, the management apparatus 202 cannot establish wireless communication with the AP 101, as described above and therefore cannot receive the "wireless parameter setting request" (706). Hence, the AP 101 finishes timer 3 (S1116) without receiving a "wireless parameter setting start" from the management apparatus 202 (709, NO in S1114). The AP 101 determines whether to transmit the "wireless parameter setting request" to another management apparatus (S1117).

In this embodiment, the management apparatuses 203 and 204 are also registered in the AP 101. Hence, the AP 101 determines to transmit the "wireless parameter setting request" (YES in S1117) and selects the management apparatus 203 having the second highest priority next to the management apparatus 202 (S1111).

The AP 101 transmits the "wireless parameter setting request" to the management apparatus 203 in the same way as described above (710, S1113). However, even the management apparatus 302 cannot establish wireless communication with the AP 101, like the management apparatus 202, and therefore cannot receive the "wireless parameter setting request" (710). As a result, the AP 101 cannot receive a "wireless parameter setting start" from the management apparatus 203 (711, NO in S1114 and YES in S1116).

The AP 101 selects the management apparatus 204 having the lowest priority from the registered management apparatuses (YES in S1117, and S1111) and transmits the "wireless parameter setting request" to the management apparatus 204 (712, S1113).

Since wireless communication is established between the AP 101 and the management apparatus 204, the management apparatus 204 can receive the "wireless parameter setting request" (712).

Upon receiving the "wireless parameter setting request" (712) (YES in S1202 in FIG. 12), the management apparatus 204 confirms whether it is currently setting wireless parameters (S1203). Since wireless parameter setting is not progressing (NO in S1203), the management apparatus 204 transmits a "wireless parameter setting start" to the AP 101 (713, S1204).

From then on, the AP 101, DSC 103, and management apparatus 204 execute the same process as described in the first embodiment, thereby executing the wireless parameter setting process (714 to 719).

According to this embodiment, even when a plurality of management apparatuses are registered in the AP, a management apparatus to set wireless parameters can be selected based on priority.

Even when a management apparatus cannot set wireless parameters due to some reason, it is possible to automatically search for another management apparatus capable of setting and execute wireless parameter setting.

Hence, even when a plurality of management apparatuses are registered in the AP, the user need only press the wireless setting start buttons provided on the AP and wireless communication apparatus to execute the wireless parameter setting process between a management apparatus and the wireless communication apparatus.

In this embodiment, a case wherein wireless communication between the AP and a management apparatus cannot be established has been described. The same process can be done even when a management apparatus transmits a "wireless parameter setting stop". In this case, even when a "wireless parameter setting stop" is received in step S1114 in FIG. 11B, the process advances not to step S1115 but to steps S1116 and S1117 to select another registered management apparatus and transmit a "wireless parameter setting request".

In this embodiment, the AP selects a management apparatus to transmit a "wireless parameter setting request" based on the registered priority. However, a management apparatus may be selected by another method. For example, an apparatus to transmit a "wireless parameter setting request" may be selected at random from the management apparatuses registered in the AP.

When the user operates the wireless setting start button, a "wireless parameter setting request" may be transmitted to a management apparatus which manages wireless parameters set in the AP. This allows the user of the wireless communication apparatus to set the wireless parameters of the wireless network as a join target only by operating the wireless setting start button of the AP included in the network.

Third Embodiment

In the first embodiment, a case wherein the AP 101 and DSC 103 in FIG. 1 execute the wireless parameter setting start operation has been described. In the third embodiment, a case wherein a printer 104 and AP 101 execute the wireless parameter setting start operation after a DSC 103 and management apparatus 102 execute the wireless parameter setting start operation will be described. The functional block diagrams and operation flows of a DSC, printer, AP, and management apparatus according to this embodiment are the same as in the first embodiment.

This will be described below with reference to FIG. 8 that shows a sequence of this embodiment and FIGS. 10 to 12 that illustrate the operation flows of the devices. Note that the operation flow of the printer 104 is the same as that of the DSC 103, as described above.

Figure 8:
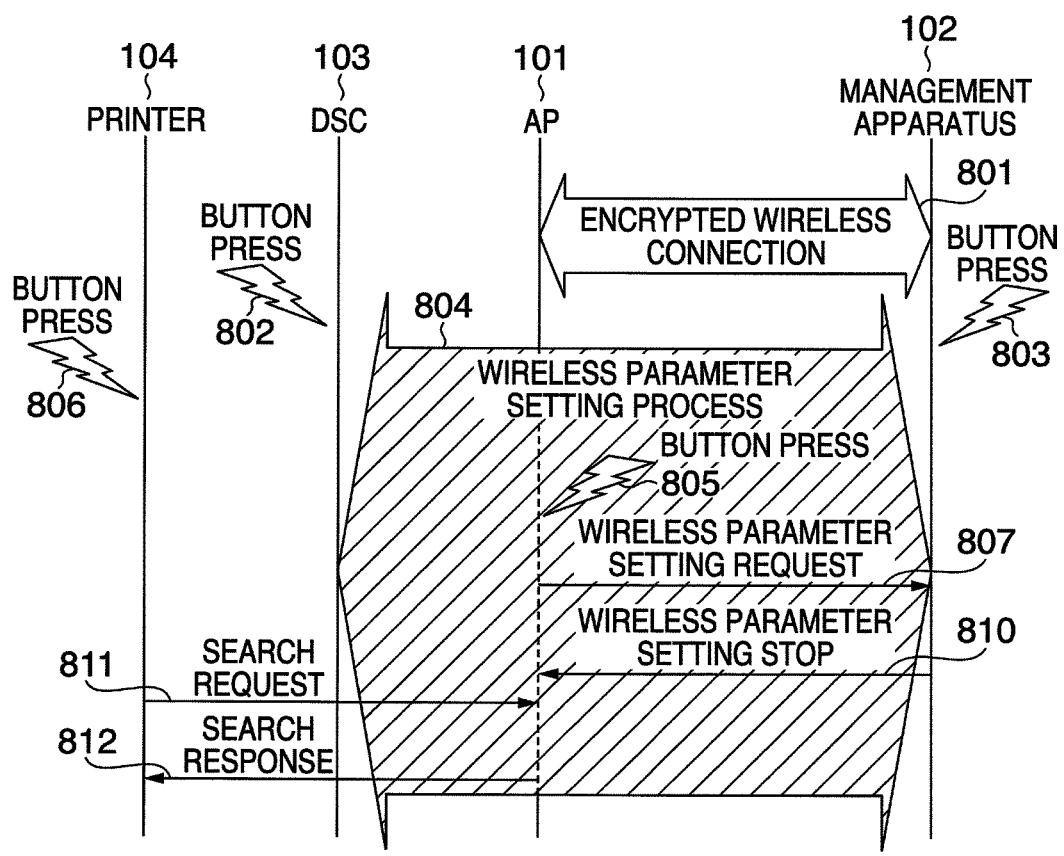
FIG. 8 is a sequence chart according to the third embodiment.

Referring to FIG. 8, the AP 101 and management apparatus 102 are connected by wireless connection for which an arbitrary encryption unit is valid (801). When the user operates a wireless setting start button provided on an operation unit 310 of the DSC 103 and a wireless setting start button (not shown) provided on the management apparatus 102 (802), the wireless parameter setting process starts via the AP 101 (804, S1001, and S1201).

The DSC 103 transmits a "search request" to search for an AP having a function of setting wireless parameters managed by a management apparatus (804, S1003).

When the user operates the wireless setting start button (803, YES in S1201), the management apparatus 102 confirms whether it is currently setting wireless parameters (S1203). Since wireless parameter setting is not progressing (NO in S1203), the management apparatus 102 transmits a "wireless parameter setting start" to the AP 101 (S1204).

The AP 101 receives the "search request" from the DSC 103 and the "wireless parameter setting start" from the management apparatus 102 (S1101, S1105, and S1107).

A case wherein the "search request" is received before reception of the "wireless parameter setting start" (YES in S1106) will be described. If the "wireless parameter setting start" is received before reception of the "search request", process [1] to be described below is omitted, and processes [2] and [3] are sequentially executed.

[1] Upon receiving the "search request" (YES in S1106), the AP 101 executes "process 3" (S1107). At this time, neither the "wireless parameter setting start" nor the "wireless parameter setting stop" is received (NO in S1131 in FIG. 11D), the AP 101 transmits a "search response" without adding wireless parameter setting enable/disable information and wireless parameter setting capability or procedure information (S1135).

[2] Upon receiving a "wireless parameter setting start" (YES in S1104), the AP 101 executes "process 2" (S1105). The AP 101 acquires wireless parameter setting enable/disable information and wireless parameter setting capability or procedure information from the received "wireless parameter setting start" (S1121 in FIG. 11C). Since wireless parameter setting is possible (YES in S1122), the AP 101 adds the information acquired from the "wireless parameter setting start" to the "search response" data and prepares for transmission (S1123). The AP 101 transmits, to the management apparatus 102, a "wireless parameter acquisition request" to designate the start of wireless parameter distribution (S1124).

[3] After that, the AP 101 receives the "search request" (S1101 and S1106 in FIG. 11A). Since the "wireless parameter setting start" has already been received (YES in S1131), the AP 101 transmits, to the DSC 103, the "search response" prepared for transmission in step S1123 (S1132).

From then on, the same process as described in the first embodiment is executed, thereby setting, in the DSC 103, wireless parameters managed by the management apparatus.

A case wherein the user executes the wireless parameter setting start operation in the printer 104 and AP 101 (805 and 806) during the above-described process, that is, after the user operates the wireless setting start buttons provided on the DSC 103 and management apparatus 102 will be described.

When the user operates a wireless setting start button 505 (805, S1101 and S1102), the AP 101 advances to "process 1" (S1103) and selects a management apparatus to request it to start setting wireless parameters (S1111 in FIG. 11B). Since only the management apparatus 102 is registered in the AP 101, the AP 101 selects the management apparatus 102. The AP 101 transmits, to the management apparatus 102, a "wireless parameter setting request" to request the start of the wireless parameter setting process (807, S1113).

Upon receiving the "wireless parameter setting request" (807) (YES in S1202), the management apparatus 102 confirms whether it is currently setting wireless parameters (S1203). Since wireless parameter setting between the management apparatus 102 and the DSC 103 has already started (YES in S1203), the wireless parameter setting process for the printer 104 is impossible. To notify the AP 101 of this, the management apparatus 102 transmits a "wireless parameter setting stop" to the AP 101 (810, S1209).

Upon receiving the "wireless parameter setting stop" (810) (S1114 in FIG. 11B), the AP 101 advances to "process 2" (S1115). The AP 101 determines based on the received "wireless parameter setting stop" that wireless parameter setting is impossible (S1121 and NO in S1122). The AP 101 adds, to the "search response", information representing that wireless parameter setting is impossible and prepares for transmission (S1125).

Upon receiving a "search request" (811) from the printer 104 (S1101 and S1106 in FIG. 11A), the AP 101 advances to "process 3" (S1107). In "process 3", since the "wireless parameter setting stop" (810) has already been received (YES in S1131), the AP 101 transmits, to the printer 104, the "search response" prepared for transmission in step S1125 (812, S1132).

Upon receiving the "search response" (812) (YES in S1004 and YES in S1005), the printer 104 recognizes that the wireless parameter setting process cannot start (NO in S1007) and stops the wireless parameter setting process. The printer 104 also notifies the user of this by, for example, displaying, on a display unit 406, a message representing that the wireless parameter setting process is impossible.

According to this embodiment, if the wireless setting start buttons of the printer and AP are operated during the wireless parameter setting process between the DSC and the management apparatus, the setting process for the DSC is continued, and that for the printer is interrupted.

Hence, even when a wireless parameter setting start designation is input to a plurality of wireless communication apparatuses, the wireless parameter setting process can be executed without any confusion.

Fourth Embodiment

In the third embodiment, a process when the printer 104 and AP 101 execute the wireless parameter setting start operation after the DSC 103 and management apparatus 102 in FIG. 1 execute the wireless parameter setting start operation has been described. In this embodiment, the order is reversed. That is, a case wherein a DSC 103 and management apparatus 102 execute the wireless parameter setting start operation after a printer 104 and AP 101 execute the wireless parameter setting start operation will be described. The functional block diagrams and operation flows of a DSC, AP, and management apparatus according to this embodiment are the same as in the first embodiment.

This will be described below with reference to FIG. 9 that shows a sequence of this embodiment and FIGS. 10 to 12 that illustrate the operation flows of the devices.

Figure 9:
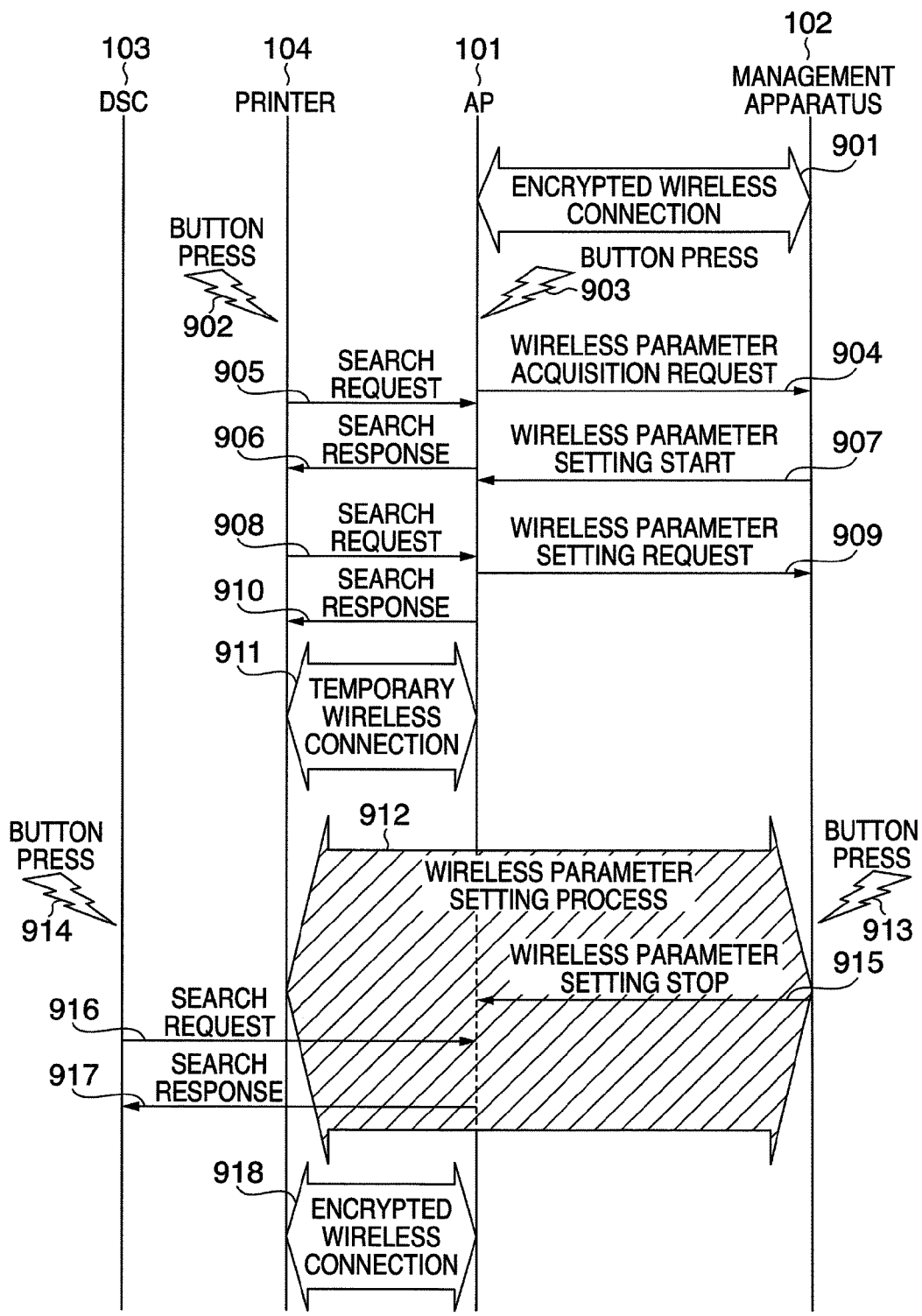
FIG. 9 is a sequence chart according to the fourth embodiment.

Referring to FIG. 9, the AP 101 and management apparatus 102 are connected by wireless connection for which an arbitrary encryption unit is valid (901). When the user operates a wireless setting start button provided on an operation unit 410 of the printer 104 and a wireless setting start button 505 provided on the AP 101 (902 and 903), the wireless parameter setting process starts (S1001, S1101, and S1102).

From then on, wireless parameters are set in the printer 104 by the same sequence as in the first embodiment (904 to 912).

A case wherein the user executes the wireless parameter setting start operation in the DSC 103 and management apparatus 102 (913 and 914) will be described.

When the user operates a wireless setting start button (913, YES in S1201), the management apparatus 102 confirms whether it is currently setting wireless parameters (S1203). Since wireless parameter setting between the management apparatus 102 and the printer 104 has already started (YES in S1203), the management apparatus 102 transmits a "wireless parameter setting stop" to the management apparatus 102 (915, S1209), thereby stopping the wireless parameter setting process for the DSC 103.

Upon receiving the "wireless parameter setting stop" (915) (S1101 and S1104 in FIG. 11A), the AP 101 advances to "process 2" (S1105). The AP 101 determines based on the received "wireless parameter setting stop" (915) that wireless parameter setting is impossible (S1121 and NO in S1122 in FIG. 11C). The AP 101 adds, to a "search response", information representing that wireless parameter setting is impossible and prepares for transmission (S1125).

Upon receiving a "search request" (916) from the DSC 103 (S1101 and S1106 in FIG. 11A), the AP 101 advances to "process 3" (S1107). In this case, since the "wireless parameter setting stop" is already received (YES in S1131), the AP 101 transmits, to the DSC 103, the "search response" prepared for transmission in step S1125 (917, S1132).

Upon receiving the "search response" (917) (S1004 and S1005), the DSC 103 recognizes that the wireless parameter setting process cannot start (NO in S1007) and stops the wireless parameter setting process. The DSC 103 also notifies the user of this by, for example, displaying, on a display unit 306, a message representing that the wireless parameter setting process is impossible.

According to this embodiment, if the wireless setting start buttons of the printer and AP are operated, and those of the DSC and management apparatus are operated during execution of the wireless parameter setting process, the setting process for the printer is continued, and that for the DSC is interrupted.

Hence, even when a wireless parameter setting start designation is input to a plurality of wireless communication apparatuses, the wireless parameter setting process can be executed without any confusion.

In the above-described embodiments, the management apparatus is connected to the wireless network formed by the AP. The management apparatus may be connected to the AP via, for example, a wired LAN.

In the above-described embodiments, each device has a wireless setting start button. However, any other form is applicable if each device has a function of designating the start of wireless parameter setting.

In the above-described embodiments, the DSC or printer has a wireless communication function. However, the DSC or printer need not always incorporate the wireless communication function. The present invention can also be applied by connecting a communication adapter having a wireless communication function to the DSC or printer.

In the above-described embodiments, the printer or DSC is used. However, the present invention is also applicable to any other device such as a digital video camera, TV, or HDD player.

In the embodiments, the IEEE802.11 wireless LAN has been described. However, the present invention is applicable to any other wireless communication scheme.

As described above, according to the embodiments, it is possible to set wireless parameters managed by a management apparatus in a wireless communication apparatus via a base station in accordance with a designation from the base station.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2006-294203, filed on Oct. 30, 2006, which is hereby incorporated by reference herein in its entirety.

The invention claimed is:

1. A base station in a system for making a management apparatus that manages a wireless parameter of a wireless network formed by the base station set the wireless parameter to a wireless communication apparatus through the base station, comprising:
 a detection unit configured to detect an operation for designating a start of wireless parameter setting;
 a request unit configured to request the management apparatus to start a wireless parameter setting process when said detection unit detects the operation;
 a notification unit configured to notify the wireless communication apparatus of wireless parameter setting information containing wireless parameter setting start enable/disable information as a response to the request from said request unit;
 a management unit configured to manage a management apparatus registered in the base station; and
 a selection unit configured to select, as a wireless parameter setting start request target, one of a plurality of management apparatuses managed by said management unit when said detection unit detects the operation,
 wherein the wireless communication apparatus executes or stops the wireless parameter setting process between the management apparatus through the base station based on the wireless parameter setting information received from the base station, and
 said request unit requests the management apparatus selected by said selection unit to start wireless parameter setting.

2. The station according to claim 1, wherein
 if the response to the request from said request unit cannot be received within a predetermined time, said selection unit selects another management apparatus managed by said management unit, and
 said request unit requests the management apparatus selected by said selection unit to start wireless parameter setting.

3. The station according to claim 1, wherein said notification unit notifies the wireless communication apparatus of the wireless parameter setting information when a signal to search for a base station having a function of setting the wireless parameter managed by the management apparatus is received from the wireless communication apparatus.

4. A management apparatus in a system for making the management apparatus that manages a wireless parameter of a wireless network formed by a base station set the wireless parameter to a wireless communication apparatus through the base station, comprising:
 a reception unit configured to receive a wireless parameter setting start request which is transmitted from the base station when an operation for designating a start of wireless parameter setting is performed in the base station;
 a determination unit configured to determine whether a wireless parameter setting process is being executed in accordance with reception by said reception unit;
 a transmission unit configured to transmit wireless parameter setting information containing wireless parameter setting start enable/disable information to the base station in accordance with a determination result by said determination unit;
 an execution unit configured to execute the wireless parameter setting process between the wireless communication apparatus that received the wireless parameter setting information from the base station through the base station when the transmission unit transmits the wireless parameter setting information representing that the start of wireless parameter setting is possible; and a detection unit configured to detect an operation for designating a start of wireless parameter setting, wherein if the wireless parameter setting process is being executed when said detection unit detects the operation, said transmission unit transmits, to the base station, information representing that wireless parameter setting is impossible.

5. A control method of a base station in a system for making a management apparatus that manages a wireless parameter of a wireless network formed by the base station set the wireless parameter to a wireless communication apparatus through the base station, comprising the steps of:

requesting the management apparatus to start a wireless parameter setting process when an operation for designating a start of wireless parameter setting is performed in the base station;

notifying the wireless communication apparatus of wireless parameter setting information containing wireless parameter setting start enable/disable information transmitted from the management apparatus as a response to the request;

managing a management apparatus registered in the base station;

selecting, as a wireless parameter setting start request target, one of a plurality of management apparatuses managed in the managing step when detecting the operation; and executing or stopping the wireless parameter setting process between the management apparatus in the wireless communication apparatus through the base station based on the wireless parameter setting information received from the base station, wherein the requesting step requests the management apparatus selected in the selecting step to start wireless parameter setting.

6. A control method of a management apparatus in a system for making the management apparatus that manages a wireless parameter of a wireless network formed by a base station set the wireless parameter to a wireless communication apparatus through the base station, comprising the steps of:

receiving a wireless parameter setting start request which is transmitted from the base station when a wireless parameter setting start designation is input in the base station;

determining whether a wireless parameter setting process is being executed in accordance with the reception;

transmitting wireless parameter setting information containing wireless parameter setting start enable/disable information to the base station in accordance with a determination result;

executing the wireless parameter setting process between the wireless communication apparatus that received the wireless parameter setting information from the base station through the base station when the wireless parameter setting information representing that the start of wireless parameter setting is possible is transmitted; and detecting an operation for designating a start of wireless parameter setting, wherein if the wireless parameter setting process is being executed when the operation is detected in the detecting step, the transmitting step transmits, to the base station, information representing that wireless parameter setting is impossible.

7. A non-transitory computer-readable storage medium storing computer-executable process steps, the computer-executable process steps causing a computer to execute the method of claim 5.

8. A non-transitory computer-readable storage medium storing computer-executable process steps, the computer-executable process steps causing a computer to execute the method of claim 6.

9. The station according to claim 1, wherein the wireless parameter setting information contains a wireless parameter setting capability or procedure information.

10. The apparatus according to claim 4, wherein the wireless parameter setting information contains a wireless parameter setting capability or procedure information.

* * * * *